Aug. 26, 1969    G. V. DE BELLA    3,463,916
PORTABLE LIGHT TOWER

Filed Jan. 19, 1967    3 Sheets-Sheet 1

INVENTOR.
GASPER V. DeBELLA
BY
Lothrop & West
ATTORNEYS

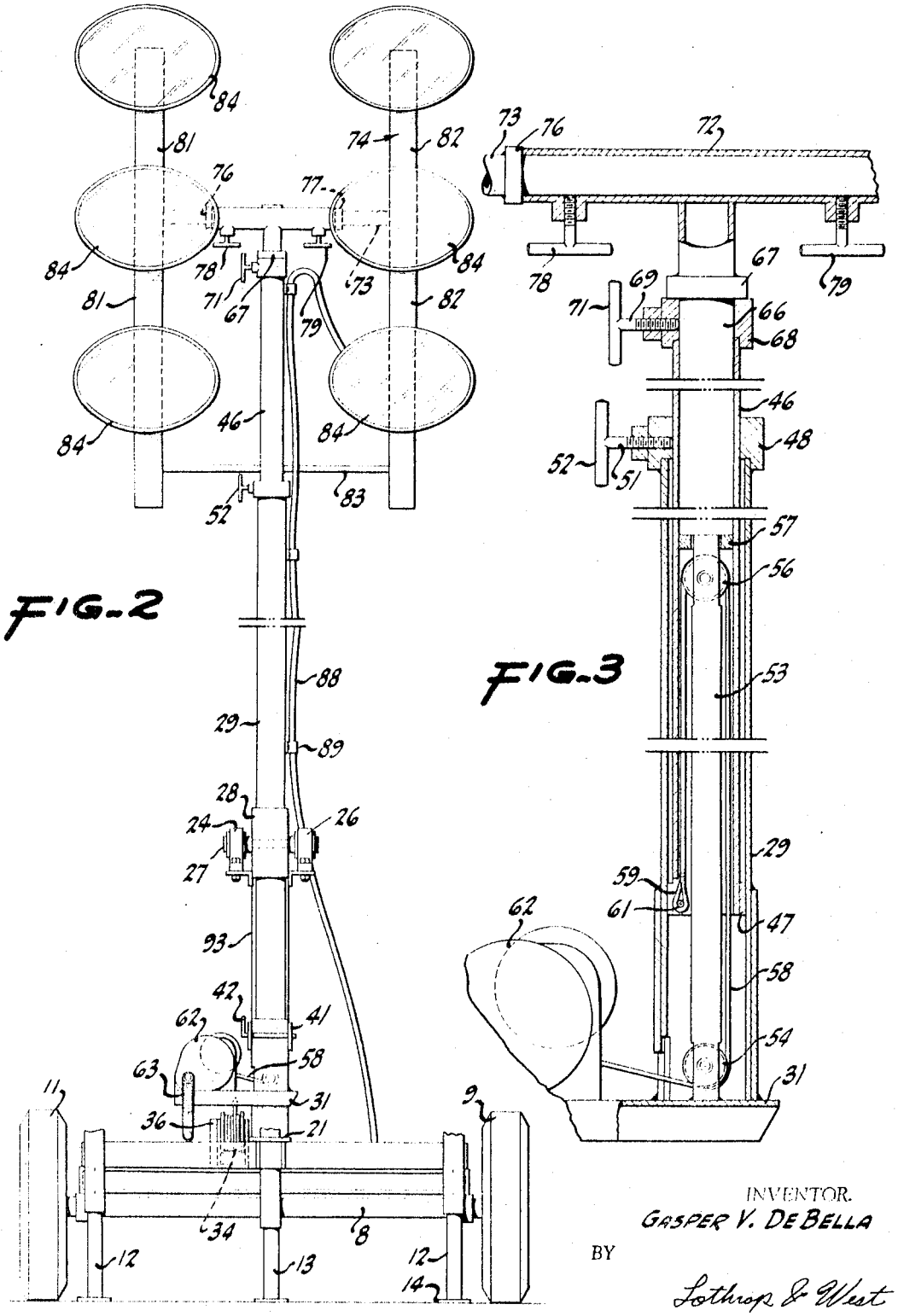

United States Patent Office 3,463,916
Patented Aug. 26, 1969

3,463,916
PORTABLE LIGHT TOWER
Gasper V. DeBella, Los Altos, Calif., assignor to
Cal-West Electric, Inc., a corporation of California
Filed Jan. 19, 1967, Ser. No. 610,427
Int. Cl. F21p 5/00
U.S. Cl. 240—3                                                    4 Claims

ABSTRACT OF THE DISCLOSURE

A portable light tower has a vertical mast mounted on a carriage. A telescoping tubular boom is attached to the upper end of the mast such that the boom may pivot about a horizontal axis. Winches are provided for raising and telescoping the boom. At the upper end of the boom a grid carrying lights mounted in a vertical plane is pivotally mounted. The mounting point is above the center of gravity of the grid such that as the boom is raised and lowered the grid will pivot freely to maintain the vertical orientation of the plane of lights.

My invention relates to means especially useful in connection with night building and contracting operations and the like for affording a portable light tower which can easily be transported from one place to another to provide an elevated platform for the lights, which can be set in various positions and attitudes.

In many instances, particularly in connection with work after dark, especially for use in contracting work or building operations or in connection with night games or night activities of any sort, it is quite helpful to have a source of powerful illumination with the lights at a considerable elevation above the ground and also in an array which can be directed in any manner desired, the entire assembly being readily portable so that it can be transferred from place to place on a job or can as easily be transported from job to job.

It is therefore an object of my invention to provide a portable light tower which can easily be carried from place to place and which when in place can quickly be erected to afford an elevated position for the lights.

Another object of the invention is to provide a portable light tower which when erected will allow the positioning of the lights in any of a number of different locations as desired.

A still further object of the invention is to provide a portable light tower which can easily be erected, adjusted and set by hand.

Another object of the invention is to provide a portable light tower that can be easily clamped in a collapsed or compact position for transport.

Another object of the invention is in general to provide an improved portable light tower.

Other objects together with the foregoing are attained in the embodiment of the invention described in the accompanying description and illustrated in the accompanying drawings, in which:

FIGURE 2 is a front elevation of the light tower pursuant to the invention but shown in a partially erected position;

FIGURE 3 is a cross section on a vertical transverse plane, with portions broken away, showing the interior construction of the boom portion of the light tower.

Figure 1:
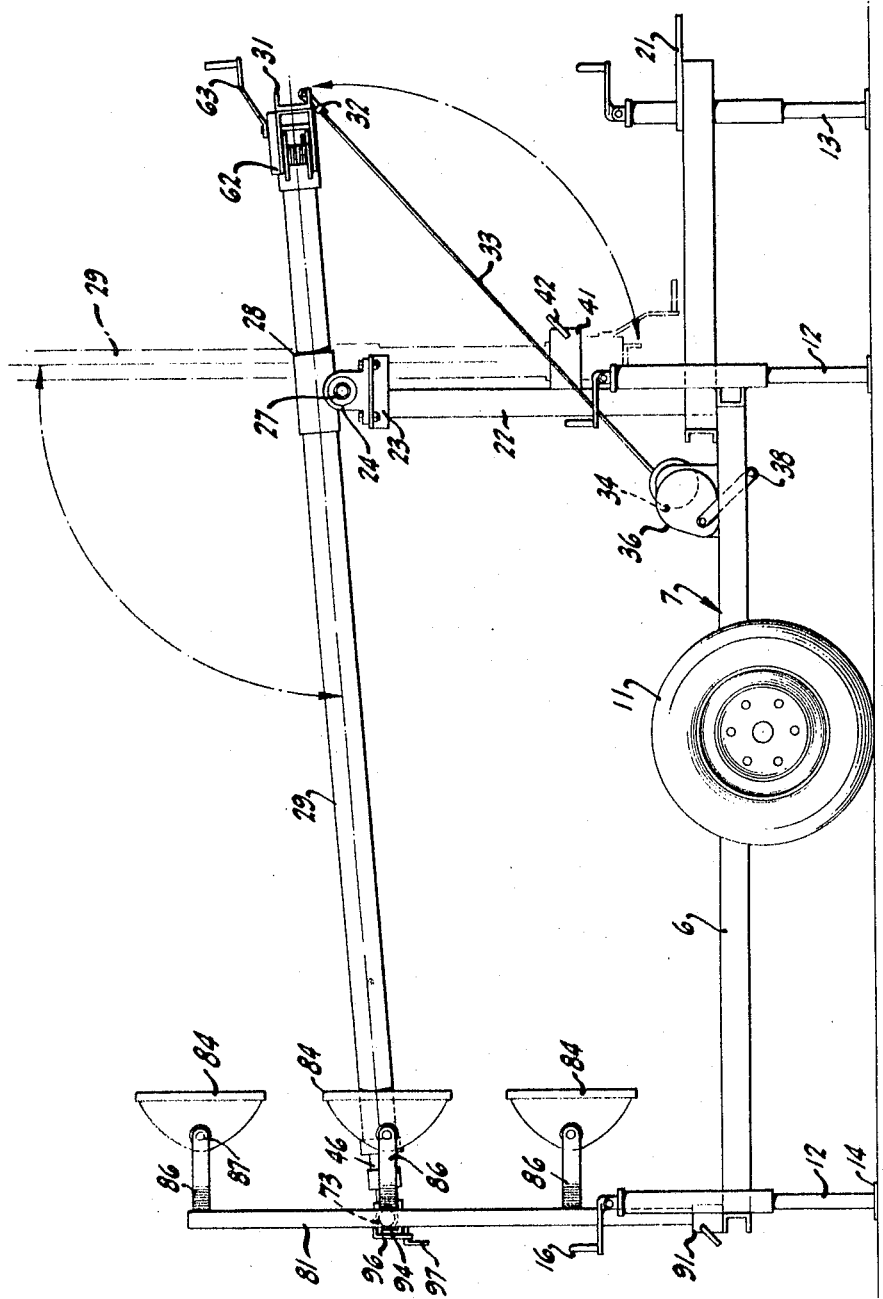
FIGURE 1 is a side elevation of a portable light tower constructed in accordance with the invention and shown in full lines in its collapsed or compact position.
Figure 4:
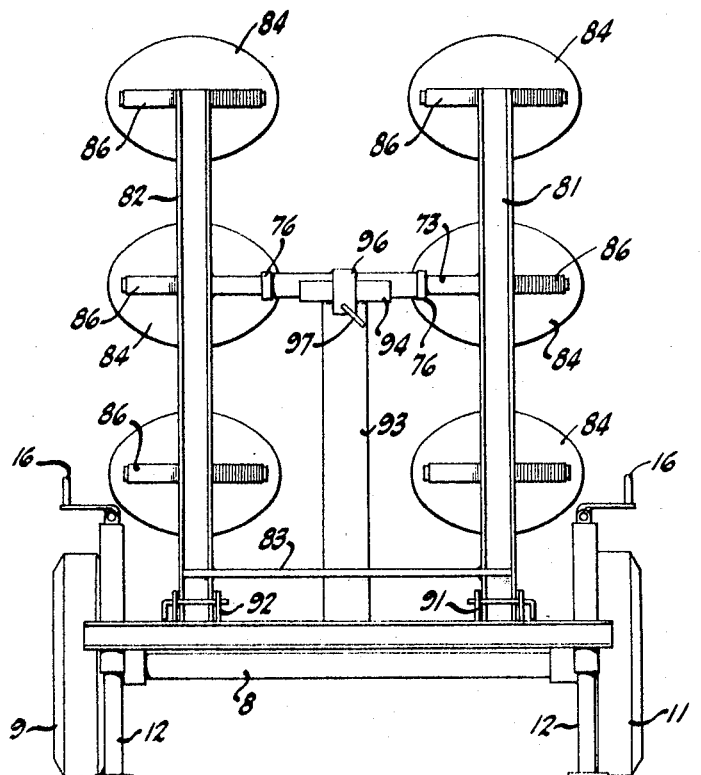
FIGURE 4 is a rear elevation of the portable light tower pursuant to the invention.

While it is possible to construct a portable light tower in accordance with the invention in a number of different ways, it has successfully been embodied in practice as shown herein. In this environment there is provided a carriage 6 made up of structural members to provide a generally horizontal frame 7 mounted on a cross axle 8 carrying ground-engaging wheels 9 and 11. The frame members 7 preferably at appropriate points are equipped with extensible mechanisms such as 12 and 13 so that feet 14 thereon can be projected or retracted by operation of hand cranks 16. With this structure, the device can be set at any desired inclination, usually level, and substantially all of the weight of it can be taken off the ground-engaging wheels 9 and 11 when the device is in use, thus affording a relatively stable platform. When the extensible mechanisms 12 and 13 are in their retracted position, the carriage can readily be transported by means of a towing tongue 21 at its forward end.

At a convenient location on the carriage 6 and preferably at a position between the ground-engaging wheels and the tongue 21, I provide an upright mast 22. This is conveniently a tubular member anchored at its base to the carriage and at its upper end carrying a platform 23 on which bearing blocks 24 and 26 are provided. A cross shaft 27 is mounted in the bearing blocks to support a sleeve 28 encompassing an intermediate portion of an outer boom tube 29. By this construction, the outer boom tube is made pivotable about a horizontal transverse axis established by the bearings 24 and 26, so that the boom can move in a longitudinal, vertical plane at the center of the carriage.

In order to erect and lower the boom, the outer boom tube 29 at its lower end is provided with a cross plate 31. Secured to the cross plate 31 is the end 32 of a cable 33 extending to the drum 34 of a hand winch 36 mounted on the frame 7. A crank 38 forming part of the winch when rotated revolves the drum 34 and takes in or permits paying out of the cable 33. Since the boom is overbalanced, it tends of its own accord to move in an anticlockwise direction as seen in FIGURE 1, but this tendency, due to gravity, is overcome by the cable 33 when the drum 34 is appropriately rotated. When the cable 33 is taken in, the boom is moved from its generally horizontal position, as shown in full lines in FIGURE 1, into an upright vertical position, as shown by the dotted lines in that figure and as illustrated in FIGURE 2. While the winch drum 34 can be locked in an appropriate position by the customary pawl and ratchet means included therewith, it is preferred to provide a secure anchorage of the boom when erected. For that reason, a yoke 41 projects from one side of the mast 22 and snugly receives the lower portion of the outer tube 29, which can be locked in place by a removable bar 42.

The boom not only includes the outer tube 29, which is circular, but likewise includes an intermediate tube 46 which is also circular and is coaxial within the tube 29. The intermediate tube 46 is slidably mounted in the outer tube and for that reason carries a bearing ring 47 at the lower end thereof and engages a bearing ring 48 at the upper end of the outer tube 29. Sliding movement between the tubes 46 and 29 is hindered or completely precluded by a screw 51 threaded into the collar 48 and having a handle 52 by which the screw can be tightened against the intermediate tube 46 to retard or lock it in any telescoped position.

In order to project and retract the tube 46, I preferably provide a block and tackle mechanism. Within the outer tube 29 and resting on the plate 31 is a post 53 cut away to mount a lower pulley 54 at the lower end thereof and an upper pulley 56 at the upper end thereof. The post 53 is steadied by a bearing disk 57 at its upper end which slidably engages the inside of the intermediate tube 46. Trained around the pulleys 54 and 56 is a rope 58, conveniently a wire rope, having its looped end 59 anchored by a pin 61 in a gap in the lower bearing ring 47. The rope 58 also extends to a winch 62 mounted on the plate 31 and operated by a hand crank 63. When the hand crank is properly rotated, the rope 58 is taken in around the pulleys 54 and 56 and this raises the pin 61 and thus the intermediate tube 46 until such time as the tube is fully projected. The tube can be stopped at any intermediate position and held either by the customary pawl and ratchet mechanism forming part of the winch 62 or can be clamped by the screw 51. In this fashion, the boom can be extended and retracted as desired. The retraction movement is normally taken care of when the boom is substantially vertical so that gravity supplies the return force.

The upper end of the intermediate tube 46 is provided with a top tube 66 freely rotatable within the intermediate tube 46 and held in position against downward thrust by a collar 67 on the tube 66 which rests against a collar 68 at the upper end of the intermediate tube 46. The tube 66 is freely rotatable about the boom axis with respect to the intermediate tube 46, but this motion can be restrained by a screw 69 threaded into the collar 68 to contact the tube 66 and provided with an operating handle 71. In this way the tube 66 can be rotated into any position and locked and can, if desired, when unlocked be completely withdrawn from the tube 46, although in most positions the friction and weight of the attendant mechanism keeps the parts in position with the blocks 67 and 68 in abutment.

In order to support a light mechanism, there is provided athwart the tube 66 a cross tube 72 symmetrically mounted and within which a pivot tube 73 forming part of a grid structure 74 is rotatably disposed. End thrust is taken up by collars 76 and 77 so that the grid structure 74 is properly centered. However, the pivot tube 73 is freely rotatable within the sleeve 72 so that there is a pivot mounting for the grid 74. The pivot axis is horizontal and is parallel to the axis established by the bearings 24 and 26 for rotation of the shaft 27. A pair of hand screws 78 and 79 are provided for locking the pivot tube 73 within the sleeve 72 when desired.

In addition to the tube 73, the grid 74 includes a pair of symmetrically disposed uprights 81 and 82 cross connected by the tube 73 and likewise provided with a cross brace 83, so that a rectangular framework is afforded. On the grid there are mounted a number of lights such as 84. These are usually mounted symmetrically and are provided with the customary adjusting mechanisms 86 and 87 so that the individual light fixtures can be pivoted about longitudinal axes and about transverse axes to take any desired attitude with respect to the grid 74.

Each of the light fixtures is provided with an electrical supply cable 88 (only one being illustrated for clarity) which is clipped at various locations to the expansible mechanism and is finally clipped to the boom by a fastening 89. The cable 88 leads to a suitable connector (not shown) on the carriage 6 so that the lights can be included in any sort of switching arrangement and connected to a source of power.

The grid 74 is not entirely symmetrical since the side members 81 and 82 are elongated downwardly below the cross brace 83 in order that the grid will be unbalanced and will have its center of gravity not only considerably lower than the axis of the sleeve 72 to act as a pendulum, but also will have the center of gravity somewhat to the left of the boom, as seen in FIGURE 1, so that the boom tends by gravity to move from its upright to its collapsed position when the structure is substantially level. The extension of the side members 81 and 82 are just sufficient to rest upon the frame 7 when the device is collapsed, being received in clamps 91 and 92. When the whole structure is lowered and the clamps 91 and 92 are tightened, the entire mechanism is held in secure position for transport. The general vertical plane of the light grid is maintained due to the pendulum action. If desired for transport, the frame 7 can be extended by an upright 93 at the rearward end thereof. The upright terminates in an angle 94 extending crosswise and in a position to be abutted by the sleeve 72 in its lowered position. A clip 96 on the sleeve overlies the angle 94 and can be held down by a fastening bolt 97.

What is claimed is:

1. A portable light tower comprising a carriage, a mast upstanding from said carriage, a boom, means for pivotally connecting said boom intermediate the ends thereof to said mast for movement about a horizontal axis, means connected to said carriage and to said boom for pivoting said boom about said connecting means, a substantially upright vertically extending grid having a center of gravity, means for pivotally connecting said grid to said boom for pendulum movement of said grid about a second axis parallel to said horizontal axis and above said center of gravity, and means for mounting lights on said grid in a plane parallel to said mast.

2. A portable light tower as in claim 1 in which said boom includes a pair of hollow telescoping members, a block and tackle mechanism disposed within the inner one of said telescoping members and including a rope fastened to the inner one of said telescoping members, and a winch mounted on the outer one of said members and carrying part of said rope.

3. A device as in claim 2 inluding a post within said telescoping members and secured to the outer one thereof, and a pulley on said post engaging said rope.

4. A portable light tower as in claim 1 in which the bottom of said grid has means adapted to rest directly on said carriage in a lowered position of said boom.

References Cited

UNITED STATES PATENTS

| | | | |
|---|---|---|---|
| 1,724,757 | 8/1929 | Frey | 240—61.6 |
| 2,500,872 | 3/1950 | Root | 240—1.3 X |
| 3,381,118 | 4/1968 | Widner | 240—1.3 X |

FOREIGN PATENTS 943,311  12/1963  Great Britain.

NORTON ANSHER, Primary Examiner

M. H. HAYES, Assistant Examiner